(12) United States Patent
Kikuti et al.

(10) Patent No.: US 6,170,599 B1
(45) Date of Patent: Jan. 9, 2001

(54) POWER STEERING APPARATUS

(75) Inventors: Mitugu Kikuti; Yoshikazu Kameda, both of Toyota (JP)

(73) Assignee: Toyota Jidosha Kabushiki Kaisha, Aichi-Ken (JP)

( * ) Notice: Under 35 U.S.C. 154(b), the term of this patent shall be extended for 0 days.

(21) Appl. No.: 09/198,345

(22) Filed: Nov. 24, 1998

(30) Foreign Application Priority Data

Nov. 25, 1997 (JP) .................................................. 9-323040

(51) Int. Cl.$^7$ ........................................................ B62D 5/06
(52) U.S. Cl. ........................................................ 180/421
(58) Field of Search .................................. 180/417, 421, 180/422, 423; 91/375 A

(56) References Cited

U.S. PATENT DOCUMENTS

| | | |
|---|---|---|
| 4,819,545 | 4/1989 | Dymond . |
| 5,070,958 | * 12/1991 | Goodrich, Jr. et al. ............. 180/423 |
| 5,230,273 | 7/1993 | Fraley, Jr. . |
| 5,687,810 | * 11/1997 | Choi et al. ........................... 180/423 |
| 5,713,429 | * 2/1998 | Doolittle ............................... 180/423 |
| 5,797,309 | * 8/1998 | Eberhart ............................... 91/375 A |

FOREIGN PATENT DOCUMENTS

| | | |
|---|---|---|
| 2-34473 | 2/1990 | (JP) . |
| 2-106467 | 4/1990 | (JP) . |
| 4099173 | 8/1992 | (JP) . |
| 6-72347 | 3/1994 | (JP) . |

* cited by examiner

Primary Examiner—Kevin Hurley
(74) Attorney, Agent, or Firm—Pillsbury Madison & Sutro LLP

(57) ABSTRACT

A groove member, a reaction force generating member and an elastic member comprise a power steering apparatus where an input shaft adapted to be coupled to a steering wheel engages an output shaft adapted to be connected to wheels to be steered. The groove member has a groove and rotates together with one of the input shaft and the output shaft. The reaction force generating member is supported by the other of the input shaft and the output shaft and is unmovable in the radial direction with respect to one of the input shaft and the output shaft and movable in the axial direction of the input shaft and the output shaft by a distance not exceeding a predetermined value. The elastic member urges one of the groove member and the reaction force generating member toward the other of the groove member and the reaction force generating member. Thus, it is possible to prevent the input shaft and the output shaft from forming an operational angle therebetween unless the steering torque inputted to the input shaft exceeds a predetermined value. The steering wheel of the invention disclosed herein provides the driver with a feel of rigidity as well as a feel of nimbleness by generating a steering assisting torque corresponding to the operational angle formed.

8 Claims, 7 Drawing Sheets

FIG.4A
FIG.4B
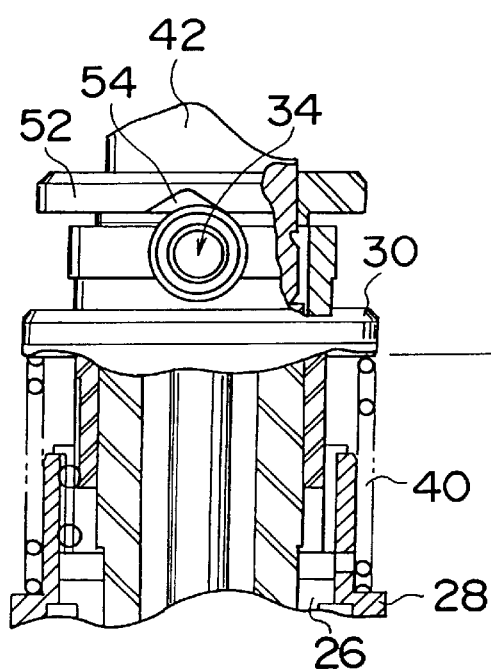
Prior to the assembling process
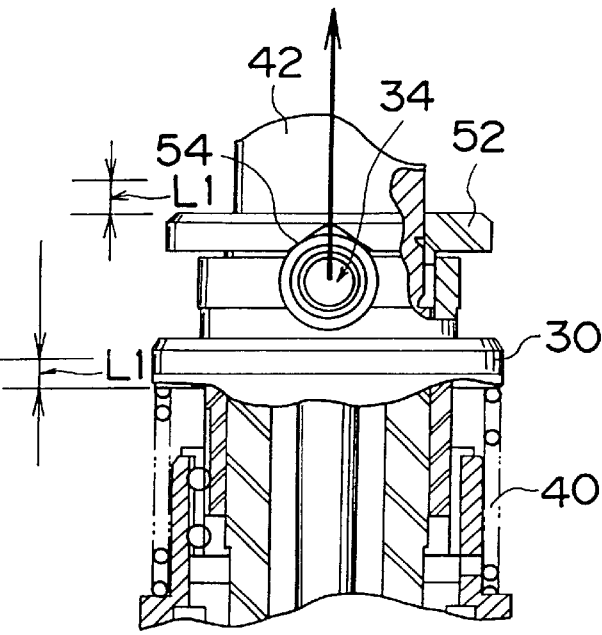
Start of the assembling process

POWER STEERING APPARATUS

INCORPORATION BY REFERENCE

The disclosure of Japanese Patent Application No. HEI 9-323040 filed on Nov. 25, 1997 including the specification, drawings and abstract is incorporated herein by reference in its entirety.

BACKGROUND OF THE INVENTION

1. Field of the Invention

The present invention relates to a power steering apparatus and, more particularly, relates to a power steering apparatus suited to generate a steering assisting force in a vehicle.

2. Description of Related Art

An apparatus generating a steering assisting force in a vehicle is disclosed, for instance, in Japanese Patent Application Laid-Open No. HEI 2-34473 (which is based on U.S. Pat. No. 4,819,545). This apparatus includes a valve shaft and a valve body. The valve shaft is concentric with the valve body and the former can rotate relative to the latter. The valve shaft and the valve body form a relative rotational angle, which will hereinafter be referred to as an operational angle.

A steering wheel is coupled to the valve shaft, while wheels to be steered are connected with the valve body via a pinion gear. The valve body and the valve shaft are coupled to each other via a torsion bar and a mechanical type reaction force mechanism. The mechanical type reaction force mechanism is composed of ① a first V-groove ring that has a first V-shaped groove and is attached to the valve shaft, ② a second V-groove ring that has a second V-shaped groove and is attached to the valve body, ③ a steel ball sandwiched between the V-shaped groove in the first V-groove ring and the V-shaped groove in the second V-groove ring and ④ a spring member urging the first V-groove ring toward the second V-groove ring.

The mechanical type reaction force mechanism thus constructed prevents the valve shaft and the valve body from forming an operational angle unless a torque effective therebetween exceeds a predetermined value. If an operational angle is formed between the valve shaft and the valve body, the torsion bar generates an angle of torsion equal to the operational angle.

If the torsion bar generates an angle of torsion, a steering reaction force corresponding to the angle of torsion is transmitted to the steering wheel. The aforementioned apparatus based on the related art is constructed such that a steering assisting force corresponding to an operational angle formed between the valve shaft and the valve body is transmitted to the valve body. Thus, the aforementioned conventional apparatus can ① prevent generation of a steering assisting force unless the steering torque inputted to the steering wheel exceeds a predetermined value and ② generate a steering assisting force corresponding to the steering torque if the steering torque exceeds the predetermined value.

Since no steering assisting force is generated until the steering torque exceeds a predetermined value, the conventional apparatus achieves a high rigidity feel in the neutral position of the steering wheel as well as enhanced steering stability. In addition, since a steering assisting force corresponding to the steering torque is generated when the steering torque exceeds the predetermined value, nimbleness during the steering operation can be achieved. Thus, the aforementioned apparatus based on the related art can provide stability and nimbleness during the steering operation.

In the aforementioned apparatus, the steel ball of the mechanical type reaction force mechanism is inhibited from being displaced solely by the first V-shaped groove in the first V-groove ring and the second V-shaped groove in the second V-groove ring. In other words, the apparatus is not equipped with any member for restricting displacement of the steel ball except for the first V-groove ring and the second V-groove ring. Thus, the apparatus may allow the steel ball to pass across the V-shaped groove in the first V-groove ring or the V-shaped groove in the second V-groove ring and slip out of its predetermined location. In this respect, the mechanical type reaction force mechanism does not provide the apparatus with the optimal structure for ensuring improved durability as well as high reliability.

SUMMARY OF THE INVENTION

The present invention is directed towards solving the aforementioned inconvenience. It is an object of the present invention to provide a power steering apparatus capable of achieving rigidity in a neutral position of a steering wheel and ensuring enhanced durability as well as high reliability without adversely affecting stability or nimbleness during the steering operation.

With a view to achieving the aforementioned object, a first aspect of the present invention provides a power steering apparatus including an input shaft, an output shaft, a groove member, a reaction force member, an elastic member and means for generating a steering assisting force corresponding to an operational angle formed between the input shaft and the output shaft. The input shaft is adapted to be coupled to a steering wheel, while the output shaft is adapted to be connected to the wheels to be steered. The groove member has a groove and rotates together with either the input shaft or the output shaft. The reaction force generating member is supported by the other of the input shaft and the output shaft and is unmovable in a radial direction with respect to one of the input shaft and the output shaft and movable in an axial direction of the input shaft and the output shaft by a distance smaller than a predetermined value. The elastic member urges one of the groove member and the reaction force generating member toward the other of the groove member and the reaction force generating member.

In the first aspect of the present invention, the elastic member urges the reaction force generating member to engage the groove in the groove member. The reaction force generating member and the groove in the groove member prevent the input shaft and the output shaft from forming an operational angle therebetween unless the steering torque inputted to the input shaft exceeds a predetermined value. The reaction force generating member and the groove allow the input shaft and the output shaft to form an operational angle therebetween if the steering torque inputted to the input shaft exceeds the predetermined value. If an operational angle is formed between the input shaft and the output shaft, a steering assisting force corresponding to the operational angle is generated. Hence, the driver of a vehicle incorporating the present invention will experience from the steering wheel a feeling of high rigidity if the steering torque is below a predetermined value and a feeling of nimbleness during the steering operation if the steering torque exceeds the predetermined value.

Further, since the reaction force generating member is unmovable in the radial direction in the present invention, the reaction force generating member is not disengaged from the groove in the groove member, and thus prevents the reaction force generating member from slipping out of a predetermined location. The present invention ensures high durability as well as high reliability by providing that the reaction force generating member is movable in the axial direction by a distance not exceeding a predetermined value.

The first aspect of the present invention may be modified such that the operational angle formed between the input shaft and the output shaft is limited to a value not exceeding a predetermined maximum operational angle. A maximum relative displacement amount in the axial direction is generated between the groove member and the reaction force generating member in correction with the maximum operational angle, and the groove has a depth larger than the maximum relative displacement amount. Hence, the reaction force generating member does not pass across the groove while the power steering apparatus is in operation. Since the reaction force generating member is always engaged with the groove, it is possible to effectively prevent the reaction force generating member from slipping out of a predetermined location.

Further, the first aspect of the present invention may be modified such that the reaction force generating member is provided with a rotational shaft attached to the other of the input shaft and the output shaft and a rolling body rolling around the rotational shaft. Thus, the rolling body can roll around the rotational shaft without moving in the radial direction with respect to the shaft member. Such rolling movement enables the rolling body to be smoothly displaced along the groove, thus achieving smooth operation in addition to high durability and high reliability.

Still further, the first aspect of the present invention may be modified such that the other of the input shaft and the output shaft is provided with a main shaft member and a sliding member axially slidable with respect to the main shaft member. The reaction force generating member is supported by the sliding member. Accordingly, it is possible to allow axial displacement of the reaction force generating member relative to the groove member while preventing the reaction force generating member from moving in the radial direction with respect to the input shaft and the output shaft. Hence, a simple structure may appropriately support the reaction force generating member.

The aforementioned object can also be achieved by a second aspect of the present invention. The second aspect of this invention provides a rotary type directional control valve employed in a power steering apparatus including an input shaft, an output shaft, a groove member, a reaction force generating member and an elastic member. The input shaft is coupled to a steering wheel, while the output shaft is connected to the wheels to be steered. The groove member has a groove and rotates together with one of the input shaft and the output shaft. The reaction force generating member is supported by the other of the input shaft and the output shaft and is unmovable in a radial direction with respect to one of the input shaft and the output shaft and movable in an axial direction of the input shaft and the output shaft by a distance not exceeding a predetermined value. The elastic member urges one of the groove member and the reaction force generating member toward the other of the groove member and the reaction force generating member. It is to be noted that the second aspect of the present invention can achieve substantially the same effect as the first aspect of the present invention.

BRIEF DESCRIPTION OF THE DRAWINGS

Further objects, features and advantages of the present invention will become apparent from the following description of preferred embodiments with reference to the accompanying drawings, wherein:

FIG. 4A illustrates a state where a cam ring is set on an outer periphery of a valve shaft and FIG. 4B illustrates a state where the cam ring is press-fitted onto the valve shaft and displaced by a predetermined distance;

DESCRIPTION OF PREFERRED EMBODIMENTS

Figure 1:
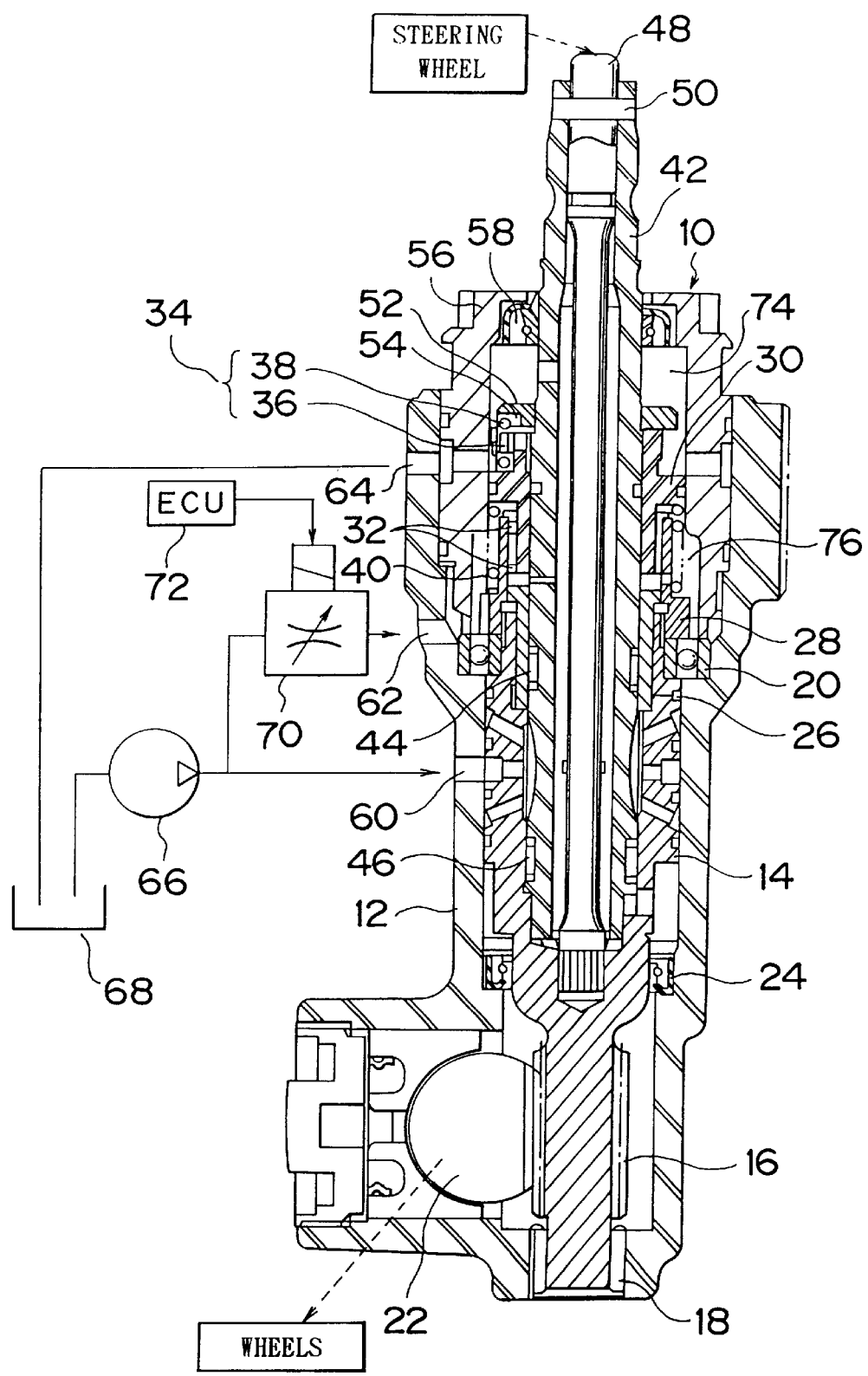
FIG. 1 is an overall structural view of a power steering apparatus according to one embodiment of the present invention.

FIG. 1 is a system structural view of a power steering apparatus according to one embodiment of the present invention. The power steering apparatus is provided with a hydraulic pressure control valve 10 that has a housing 12. A valve body 14 is disposed in the housing 12. A pinion gear 16 is integrated with a lower portion of the valve body 14. A needle bearing 18 is disposed near a lower end portion of the pinion gear 16. A bearing 20 is disposed on an upper end portion of the valve body 14 (approximately at the center of the hydraulic pressure control valve 10). The valve body 14 and the pinion gear 16 are rotatably supported within the housing 12 via the needle bearing 18 and the bearing 20.

The pinion gear 16, which has helical gear teeth on a peripheral surface thereof and is rotated by rotation of a steering wheel (not shown), engages a rack 22. The rack 22 extends in the axial direction, that is, in a direction perpendicular to the FIG. 1 drawing sheet, and is connected with left and right wheels to be steered. The rack 22 is displaced in the axial direction in accordance with rotation of the pinion gear 16. A steering angle corresponding to a displacement amount of the rack 22 can be obtained in the left and right wheels to be steered.

An oil seal 24 is fitted to the valve body 14 at a location higher than the pinion gear 16. As will later be described, power steering oil (hereinafter referred to as PS oil) is introduced into the housing 12. The oil seal 24 prevents PS oil from leaking out into an area surrounding the pinion gear 16.

A press-fit ring 26 is press-fitted into an inner periphery of the upper end portion of the valve body 14, whereas a nut member 28 is screwed onto an outer periphery of the upper end portion of the valve body 14. As the nut member 28 is screwed onto the valve body 14, the press-fit ring 26 is press-fitted into the nut member 28. Accordingly, the valve body 14 and the nut member 28 are assembled such that they will become strictly concentric with each other.

Inserted into an upper end portion of the nut member 28 is a lower end portion of a reaction force piston 30. Ball grooves extending in the axial direction (top-to-bottom directions in FIG. 1) are formed in an inner peripheral surface of the nut member 28 and an outer peripheral surface of the lower end portion of the reaction force piston 30. Balls 32 capable of rolling along the ball grooves are interposed between the nut member 28 and the reaction force piston 30.

The balls 32 prevent rotational displacement of the reaction force piston 30 relative to the nut member 28 but allow axial displacement of the reaction force piston 30 relative to the nut member 28. Therefore, the aforementioned construction enables the reaction force piston 30 to be displaced relative to the nut member 28 only in the axial direction while preventing the reaction force piston 30 from rotating relative to the nut member 28.

A reaction force generating member 34 is disposed on an upper end portion of the reaction force piston 30. The reaction force generating member 34 includes a rotational shaft 36 attached to the reaction force piston 30 and a rolling body 38 capable of rolling round the rotational shaft 36. The rotational shaft 36 is disposed such that the axial direction thereof coincides with the radial direction of the reaction force piston 30. Hence, the rolling body 38 can rotate in a plane perpendicular to the radial direction of the reaction force piston 30.

A reaction force spring 40 is disposed near a lower portion of the reaction force piston 30. The reaction force spring 40 generates such an urging force as to increase the total axial length of the reaction force piston 30 and the nut member 28. Thus, the reaction force generating member 34 is always urged upwards in the embodiment illustrated in FIG. 1.

A valve shaft 42 is disposed within the valve body 14. Disposed between the valve shaft 42 and the valve body 14 are needle bearings 44 and 46, which hold the valve shaft 42 such that the valve shaft 42 can rotate relative to the valve body 14.

A torsion bar 48 is disposed within the valve shaft 42. The torsion bar 48, which exhibits a predetermined elasticity in a direction of torsion, extends through the valve shaft 42. The torsion bar 48 is secured to the valve shaft 42 at an upper end thereof by means of a securing pin 50. On the other hand, the torsion bar 48 is press-fitted into the valve body 14 at a lower end thereof.

A cam ring 52, which is an annular member that has a groove 54 extending in the radial direction, is press-fitted onto the valve shaft 42. In this embodiment, the groove 54 has a shape of V as can be seen from a side view in FIG. 1. The cam ring 52 is mounted on the valve shaft 42 such that the reaction force generating member 34 engages the groove 54 and the reaction force spring 40 contracts by a predetermined length.

A cap 56 is tightly attached to an upper end portion of the housing 12 to prevent leakage of PS oil. Further, an oil seal 58 surrounding the valve shaft 42 is attached to the cap 56. This construction can reliably prevent PS oil introduced into the hydraulic pressure control valve 10 from leaking out of the periphery of the cap 56.

The housing 12 of the hydraulic pressure control valve 10 is provided with a pump hydraulic pressure introduction port 60, a control hydraulic pressure introduction port 62 and a hydraulic pressure drain port 64. The pump hydraulic pressure introduction port 60 communicates with a discharge port of a power steering pump 66 (hereinafter referred to as a PS pump 66). The PS pump 66 pumps up PS oil stored in a reservoir tank 68 and discharges the same.

The control hydraulic pressure introduction port 62 communicates with a reaction force control valve 70 which changes its effective opening area in accordance with driving signals supplied from an electronic control unit 72 (hereinafter referred to as an ECU 72). The discharge port of the PS pump 66 communicates with the reaction force control valve 70. Hence, a hydraulic pressure supplied from the PS pump 66 is reduced to a value corresponding to instructions from the ECU 72 and then supplied to the control hydraulic pressure introduction port 62.

The reservoir tank 68 communicates with the hydraulic pressure drain port 64. Formed inside the hydraulic pressure control valve 10 is a low pressure chamber 74 communicating with the hydraulic pressure drain port 64. As described above, the PS oil supplied to the pump hydraulic pressure introduction port 60 and the control hydraulic pressure introduction port 62 is suitably reduced in flowing through the inside of the hydraulic pressure control valve 10 and then introduced into the low pressure chamber 74. The PS oil introduced into the low pressure chamber 74 thereafter flows through the hydraulic pressure drain port 64 into the reservoir tank 68.

The valve shaft 42 and the valve body 14 of the hydraulic pressure control valve 10 rotate relative to each other, thus causing the PS oil supplied from the pump hydraulic pressure introduction port 60 to follow different routes. In other words, a power piston, although not shown, communicates with the hydraulic pressure control valve 10. The power piston is provided with two hydraulic pressure chambers defined by a piston. When hydraulic pressure is supplied to one of the hydraulic pressure chambers, the power piston generates a steering assisting force that urges the rack 22 toward one side in the axial direction. When hydraulic pressure is supplied to the other of the hydraulic pressure chambers, the power piston generates a steering assisting force that urges the rack 22 toward the other side in the axial direction. The power piston for generating a steering assisting force may be constructed according to the disclosed content of U.S. Pat. No. 4,819,545, which has been cited herein as an example of the related art.

If a reference positional relationship is established between the valve shaft 42 and the valve body 14, the valve shaft 42 and the valve body 14 form a route that allows the PS oil supplied to the pump hydraulic pressure introduction port 60 to reach the low pressure chamber 74 without flowing into either of the two hydraulic pressure chambers of the power piston. A state where such a route is formed will hereinafter be referred to as a hydraulically neutral state, and a relative rotational angle formed between the valve shaft 42 and the valve body 14 based on the hydraulically neutral state will be referred to as an operational angle.

The valve shaft 42 and the valve body 14, if an operational angle is formed therebetween due to a left turn of the former relative to the latter, form a route that allows the PS oil supplied to the pump hydraulic pressure introduction port 60 to reach one of the hydraulic pressure chambers of the power piston at a ratio corresponding to the operational angle. In this case, the power piston generates a steering assisting force corresponding to the operational angle in such a direction as to turn the wheels to the left.

The valve shaft 42 and the valve body 14, if an operational angle is formed therebetween due to a right turn of the former relative to the latter, form a route that allows the PS oil supplied to the pump hydraulic pressure introduction port 60 to reach the other of the hydraulic pressure chambers of the power piston at a ratio corresponding to the operational angle. In this case, the power piston generates a steering assisting force corresponding to the operational angle in such a direction as to turn the wheels to the right.

As described above, the power steering apparatus according to this embodiment generates no steering assisting force when the valve shaft 42 and the valve body 14 are held in the hydraulically neutral state. If an operational angle is formed between the valve shaft 42 and the valve body 14, the power steering apparatus generates a steering assisting force corresponding to the operational angle.

In the hydraulic pressure control valve 10 according to this embodiment, the control hydraulic pressure introduction port 62 communicates with a control hydraulic pressure chamber 76, which is formed near the lower portion of the reaction force piston 30. Therefore, the PS oil supplied to the control hydraulic pressure introduction port 62 is introduced to the lower portion of the reaction force piston 30. However, an upper portion of the reaction force piston 30 is exposed to the aforementioned low pressure chamber 74. As a result, a differential pressure equal to a difference in inner pressure between the control hydraulic pressure chamber 76 and the low pressure chamber 74 (hereinafter referred to as a control differential pressure) is generated across the reaction force piston 30.

The control differential pressure generated across the reaction force piston 30 generates, as the reaction force spring 40 does, a force urging the reaction force piston 30 toward the cam ring 52. Accordingly, the reaction force generating member 34 of the hydraulic pressure control valve 10 is urged toward the cam ring 52 by a resultant force composed of a spring force generated by the reaction force spring 40 and an urging force resulting from the control differential pressure. The resultant force will hereinafter be referred to as a resultant urging force.

Figure 2:
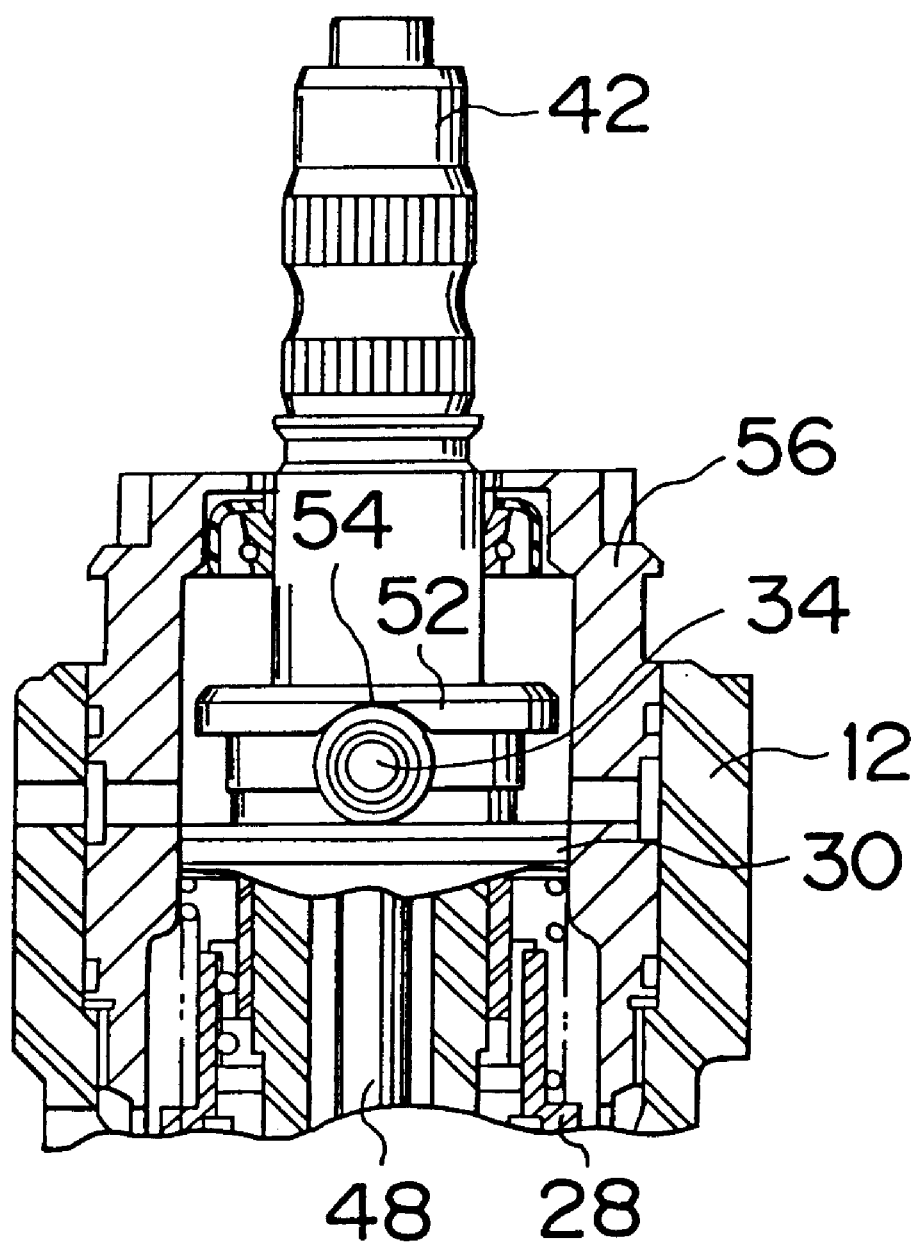
FIG. 2 illustrates a broken away portion of the apparatus looking from the left side of FIG. 1, in a state where no steering torque is inputted thereto.

FIG. 2 illustrates part of the hydraulic pressure control valve 10 as viewed from the left side of FIG. 1 when no steering torque is inputted to the valve shaft 42. As described above, the reaction force generating member 34 of the hydraulic pressure control valve 10 is urged toward the cam ring 52 by the resultant urging force. In this case, the reaction force generating member 34 engages the groove 54 of the cam ring 52 at the center thereof as illustrated in FIG. 2.

As described previously, the hydraulic pressure control valve 10 is constructed such that the cam ring 52 does not rotate relative to the valve shaft 42 and that the reaction force generating member 34 does not rotate relative to the valve body 14 (See FIG. 1). In the state as illustrated in FIG. 2, a location of the reaction force generating member 34 relative to the cam ring 52 is determined based on engagement of the reaction force generating member 34 with the groove 54 at the center thereof. In this case, a positional relationship in the rotational direction between the valve shaft 42 and the valve body 14 is specifically determined.

In this embodiment, when the positional relationship as illustrated in FIG. 2 is established between the valve shaft 42 and the valve body 14, the operational angle formed therebetween becomes null. In other words, the hydraulically neutral state is realized. Therefore, the power steering apparatus according to this embodiment generates no steering assisting force if the state as illustrated in FIG. 2 is maintained.

Figure 3:
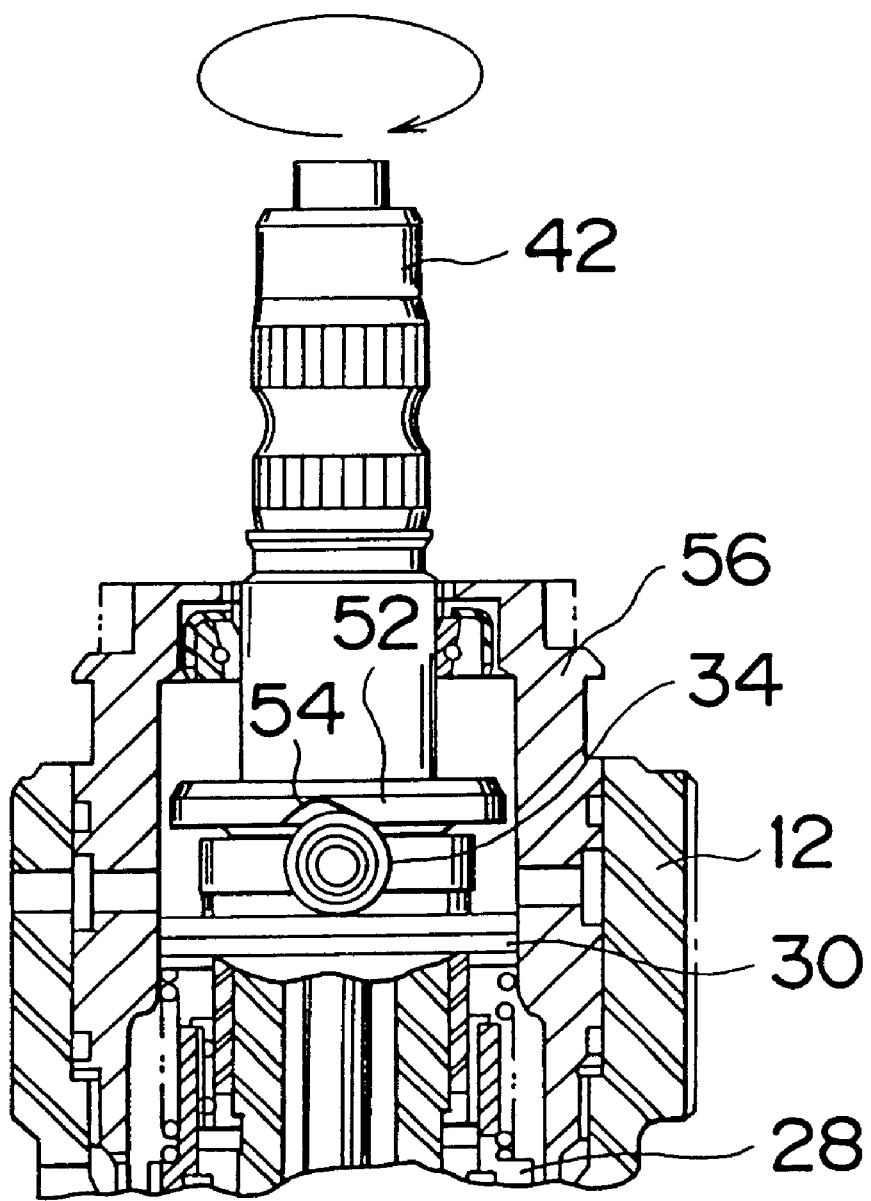
FIG. 3 illustrates a broken away portion of the apparatus looking from the left side of FIG. 1, in a state where a steering torque exceeding a predetermined value is inputted thereto.

FIG. 3 illustrates part of the hydraulic pressure control valve 10 as viewed from the left side of FIG. 1 when a steering torque exceeding a predetermined value is inputted to the valve shaft 42. Provided that the valve shaft 42 and the valve body 14 are maintained in the hydraulically neutral state as illustrated in FIG. 2, if a steering torque is inputted to the valve shaft 42, the reaction force generating member 34 is pressed by a wall surface of the groove 54 formed in the cam ring 52 so that the steering torque is transmitted to the valve body 14.

The pressing force applied to the reaction force generating member 34 by the groove 54 formed in the cam ring 52 includes a component (hereinafter referred to as a separation component) that urges the reaction force generating member 34 away from the cam ring 52 (downwards in FIG. 3). In this embodiment, the reaction force generating member 34 is urged toward the cam ring 52 by the resultant urging force. The reaction force generating member 34 remains engaged with the groove 54 at the center thereof as illustrated in FIG. 2 while the separation component is smaller than the resultant urging force. If a separation component exceeding the resultant urging force is generated, the reaction force generating member 34 moves together with the reaction force piston 30 away from the cam ring 52 (downwards in FIG. 3).

By moving away from the cam ring 52, the reaction force generating member 34 is allowed to rotate relative to the cam ring 52 as can be seen from FIG. 3. Thus, an operational angle is formed between the valve shaft 42 and the valve body 14 in this embodiment if a separation component exceeding the resultant urging force is generated.

In the hydraulic pressure control valve 10, the separation component is proportional to the steering torque inputted to the valve shaft 42. Thus, a separation component exceeding the resultant urging force is generated if a steering torque T exceeding a predetermined value $T_0$ is inputted to the valve shaft 42. The predetermined value $T_0$ is obtained by multiplying the resultant urging force f by a proportional constant k: $T_0 = k \cdot f$. Thus, an operational angle is formed between the valve shaft 42 and the valve body 14 in this embodiment if the steering torque inputted to the valve shaft 42 exceeds the predetermined value $T_0$.

If an operational angle is formed between the valve shaft 42 and the valve body 14 in the hydraulic pressure control valve 10, the torsion bar 48 forms an angle of torsion equal to the operational angle. The torsion bar 48 forms an angle of torsion substantially proportional to the steering torque inputted to the valve shaft 42. Hence, an operational angle substantially proportional to the steering torque inputted to the valve shaft 42 is formed between the valve shaft 42 and the valve body 14 in the hydraulic pressure control valve 10.

In this manner, the hydraulic pressure control valve 10 maintains the operational angle formed between the valve shaft 42 and the valve body 14 at zero unless the steering torque exceeds the predetermined value $T_0$. On the other hand, if the steering torque exceeds the predetermined value $T_0$, the operational angle is controlled substantially in proportion with the steering torque.

As a result, the power steering apparatus according to this embodiment can prevent generation of a steering assisting force when the steering torque is smaller than the predetermined value $T_0$ and can generate a steering assisting force substantially proportional to the steering torque when the steering torque exceeds the predetermined value $T_0$. Thus, the power steering apparatus according to this embodiment can achieve a feel of high rigidity in the vicinity of the neutral position of a steering wheel as well as a feel of nimbleness during the steering operation.

In the hydraulic pressure control valve 10, as previously described, the reaction force generating member 34 is composed of the rotational shaft 36 attached to the reaction force piston 30 and the rolling body 38 capable of rolling round the rotational shaft 36. Such a construction enables the reaction force generating member 34 to be positioned in the radial direction with respect to the valve body 14 without employing a complicated mechanism.

Further, the aforementioned construction allows displacement of the reaction force generating member 34 in the axial direction of the valve body 14 and prevents the reaction force generating member 34 from moving away from the reaction force piston 30 in the axial direction of the valve body 14 without employing a complicated mechanism. Hence, with a simple mechanism, the hydraulic pressure control valve 10 according to this embodiment allows necessary displacement of the reaction force generating member 34 and prevents the same from falling away from a predetermined location.

In addition, the reaction force generating member 34 of the hydraulic pressure control valve 10 according to this embodiment causes the rolling body 38 to roll along the wall surface of the groove 54 when the valve shaft 42 rotates relative to the valve body 14. Due to the rolling movement of the rolling body 38 along the wall surface of the groove 54, the reaction force generating member 34 can smoothly be displaced relative to the cam ring 52. Therefore, the hydraulic pressure control valve 10 according to this embodiment can smoothly increase or decrease the operational angle.

The valve shaft 42 and the valve body 14 of the hydraulic pressure control valve 10 according to this embodiment are required to achieve the hydraulically neutral state when the reaction force generating member 34 engages the groove 54 formed in the cam ring 52 at the center thereof (See FIG. 2). This requirement can be satisfied in assembling the hydraulic pressure control valve 10, for example, by ① mounting the valve shaft 42 on the valve body 14 in such a positional relationship as to realize the hydraulically neutral state and ② press-fitting the cam ring 52 onto the valve shaft 42 such that the reaction force generating member 34 engages the groove 54 at the center thereof.

The hydraulic pressure control valve 10 according to this embodiment is constructed such that the aforementioned assembling process marked with ② can be carried out with ease. The assembling process ② will now be described more concretely with reference to FIGS. 4A and 4B.

FIG. 4A illustrates a state where the cam ring 52 is set on the outer periphery of the valve shaft 42, that is, a state immediately before the cam ring 52 is mounted onto the valve shaft 42. The mounting process of the cam ring 52 is carried out after the valve body 14 (See FIG. 1) and the valve shaft 42 have been adjusted such that the hydraulically neutral state is achieved and the reaction force spring 40, the reaction force piston 30 and the like have been mounted on the outer periphery of the valve shaft 42.

If the cam ring 52 illustrated in FIG. 4A is pressed downwards, the cam ring 52 is secured to the outer periphery of the valve shaft 42. The cam ring 52, when set on the outer periphery of the valve shaft 42, can rotate relative to the valve shaft 42. In this embodiment, the cam ring 52 is suitably located such that the reaction force generating member 34 engages at least a part of the groove 54 before the cam ring 52 begins to be press-fitted onto the valve shaft 42.

FIG. 4B illustrates a state where the cam ring 52 is pressed toward the reaction force piston 30 by a predetermined distance L1 from the location as illustrated in FIG. 4A. When the cam ring 52 is pressed downwards by the predetermined distance L1, the reaction force spring 40 contracts by a stroke substantially equal to L1. When the reaction force spring 40 contracts, a spring force is applied to the reaction force piston 30 upwards in FIG. 4B.

The spring force applied to the reaction force piston 30 upwards in FIG. 4B is transmitted through the reaction force generating member 34 to a side face of the groove 54 formed in the cam ring 52. As a result, the cam ring 52 is subjected to such a torque as to align the reaction force generating member 34 with the groove 54. In this embodiment, the cam ring 52, if in the state as illustrated in FIG. 4B, can rotate relative to the valve shaft 42. Therefore, if the aforementioned torque is applied to the cam ring 52, it is displaced until the reaction force generating member 34 engages the groove 54 at the center thereof.

After assuming the state as illustrated in FIG. 4B, the cam ring 52 is further pressed toward the reaction force piston 30. As the cam ring 52 is further pressed toward the reaction force piston 30, the cam ring 52 is continually subjected to such a torque so as to align the reaction force generating member 34 with the groove 54. Thus, the cam ring 52 is mounted onto the valve shaft 42 with the reaction force generating member 34 being aligned with the groove 54.

The cam ring 52, after being completely mounted onto the valve shaft 42, cannot rotate relative thereto. Therefore, as long as the valve shaft 42 and the valve body 14 maintain the hydraulically neutral state after completion of the aforementioned assembling process, the reaction force generating member 34 always engages the groove 54 at the center thereof.

In this manner, the hydraulic pressure control valve 10 according to this embodiment allows the valve shaft 42 and the valve body 14 to achieve the hydraulically neutral state without necessitating a complicated assembling process under the circumstances where the reaction force generating member 34 engages the groove 54 at the center thereof. Consequently, the hydraulic pressure control valve 10 according to this embodiment can ensure enhanced steering stability as well as high productivity.

The shape of the groove 54 formed in the cam ring 52 will now be described with reference to FIGS. 5 through 8.

Figure 5:
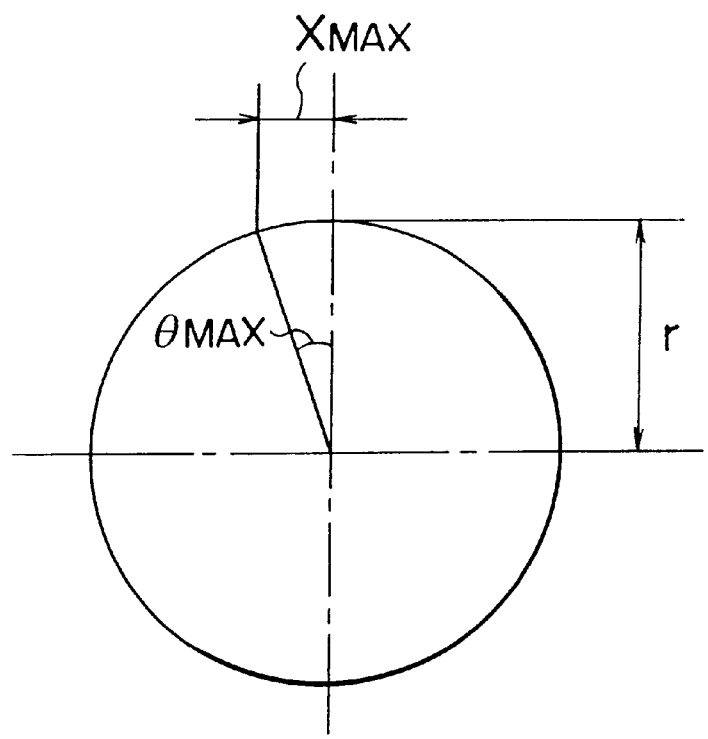
FIG. 5 illustrates a relationship between the maximum operational angle $\theta_{MAX}$ formed between the valve shaft and a valve body and the maximum relative displacement amount $X_{MAX}$ generated between a reaction force generating member and a groove.

FIG. 5 illustrates a relationship between the maximum operational angle $\theta_{MAX}$ formed between the valve shaft 42 and the valve body 14 and the maximum displacement amount $X_{MAX}$ generated between the reaction force generating member 34 and the groove 54. The character "r" in FIG. 5 represents a turning radius of the reaction force generating member 34 and the groove 54.

In this embodiment, the valve shaft 42 and the valve body 14 are constructed such that the operational angle formed therebetween does not exceed the maximum value $\theta_{MAX}$. Thus, the maximum displacement amount $X_{MAX}$ generated between the reaction force generating member 34 and the groove 54 can approximately be expressed using the maximum value $\theta_{MAX}$ and the turning radius r as follows:

$$X_{MAX} = r \cdot \theta_{MAX} \tag{1}$$

Figure 6:
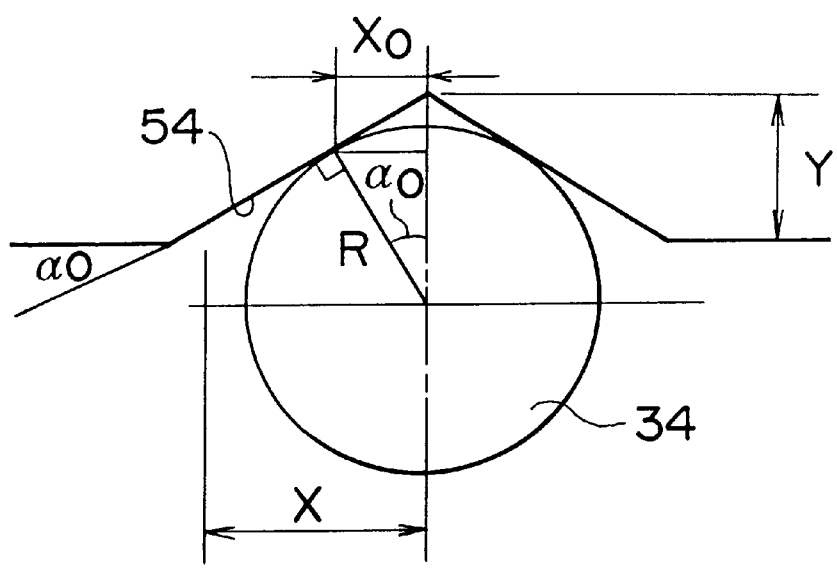
FIG. 6 illustrates a shape of the groove formed in the cam ring employed in the hydraulic pressure control valve as illustrated in FIG. 1.

FIG. 6 illustrates the conditions to be fulfilled by the shape of the groove 54. In the power steering apparatus according to this embodiment, the feel of high rigidity in the vicinity of the neutral position of the steering wheel largely depends on the shape of the groove 54. In order to achieve a feel of high rigidity to a desired extent, the groove 54 has a shape of V with a predetermined inclination $\alpha_0$ as illustrated in FIG. 6.

As can be seen from FIG. 6, when the reaction force generating member 34 engages the groove 54 at the center thereof, the reaction force generating member 34 contacts the wall surface of the groove 54 at a location horizontally spaced apart from the center thereof by a predetermined distance $X_0$. The predetermined distance $X_0$ can be expressed using a radius R of the reaction force generating member 34 and the inclination $\alpha_0$ of the wall surface as follows:

$$X_0 = R \cdot \sin \alpha_0 \qquad (2)$$

As described above, the relative displacement amount generated between the reaction force generating member 34 and the groove 54 can reach the maximum value of $X_{MAX} = r \cdot \theta_{MAX}$. If the maximum displacement amount $X_{MAX}$ is generated between the reaction force generating member 34 and the groove 54, a horizontal distance X between the center and an end of the groove 54 can be obtained by calculating a sum of $X_{MAX}$ and $X_0$ as follows:

$$X = R \cdot \sin \alpha_0 + r \cdot \theta_{MAX} \qquad (3)$$

With a view to inhibiting fluctuations in steering characteristics and enhancing durability of the reaction force generating member 34, the hydraulic pressure control valve 10 is preferably required to prevent further displacement of the reaction force generating member 34 across the groove 54. Thus, it is desirable to prevent displacement beyond the horizontal distance X as obtained from the aforementioned formula (3) between the center and the end of the groove 54. In other words, it is preferable that the groove 54 have a depth Y expressed as follows:

$$Y = X \cdot \tan \alpha_0 \qquad (4)$$

Figure 7:
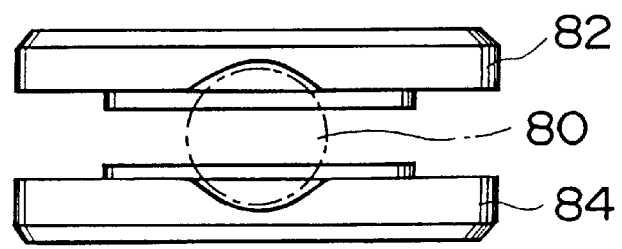
FIG. 7 is a front view of a mechanism for comparison with a mechanism used to provide the hydraulic pressure control valve according to a first embodiment of the present invention with high rigidity in the vicinity of a neutral position thereof.

FIG. 7 illustrates an example of a mechanism for achieving high rigidity in the vicinity of the neutral position of the steering wheel, the mechanism being composed of a steel ball 80 and a pair of cam rings 82 and 84. The cam ring 82 is attached to the valve shaft 42 (not shown), while the cam ring 84 is mounted on the valve body 14 (not shown) such that it can be displaced only in the axial direction of the valve body 14 (not shown). The cam rings 82 and 84 are urged toward each other by an elastic member which is not shown.

The steel ball 80 and the cam rings 82 and 84 prevent the valve shaft 42 and the valve body 14 from forming an operational angle therebetween unless the steering torque inputted to the valve shaft 42 exceeds a predetermined value. Accordingly, the embodiment as illustrated in FIG. 7 can achieve substantially the same function as the cam ring 52 and the reaction force generating member 34.

However, realization of the construction as illustrated in FIG. 7 requires that the steel ball 80 be sandwiched between the cam rings 82 and 84. In this construction, if the cam rings 82 and 84 have a deep groove formed therein, they may contact each other. Accordingly, the embodiment shown in FIG. 7 does not allow grooves of arbitrary depths to be formed in the cam rings 82 and 84.

Figure 8:
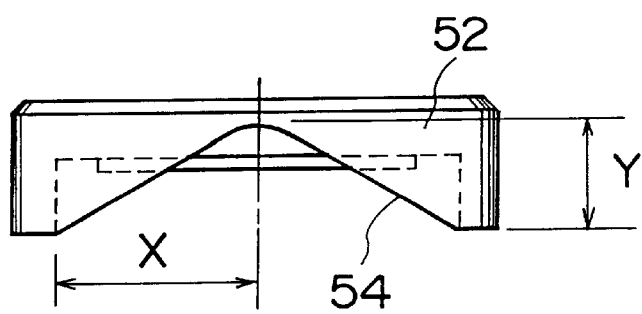
FIG. 8 is a front view of the cam ring used in the hydraulic pressure control valve as illustrated in FIG. 1.

FIG. 8 is a front view of the cam ring 52 used in this embodiment. As described above, the hydraulic pressure control valve 10 has the reaction force generating member 34 attached to the reaction force piston 30. Thus, the hydraulic pressure control valve 10 does not require sandwiching the reaction force generating member 34 between a pair of cam rings and can perform desired functions solely by means of the cam ring 52.

With the cam ring 52 employed as a single member, the possibility of the cam ring 52 interfering with other members is removed, and thus the groove 54 may have a sufficient depth. The groove 54 formed in the cam ring 52 in this embodiment has a half-width X (as illustrated in FIG. 8) according to formula (3) and a depth Y as expressed in formula (4). As a result, the hydraulic pressure control valve 10 of this embodiment can achieve enhanced steering stability and great durability.

The configuration of another cam ring 90 used in the hydraulic pressure control valve 10 will now be described with reference to FIGS. 9 and 10.

In this embodiment, the shape of a groove to be formed in the cam ring is an essential factor affecting a feeling of rigidity near the neutral position of the steering wheel. In the hydraulic pressure control valve 10, the shape of a groove formed in the cam ring is also an essential factor for preventing the reaction force generating member 34 from passing across the groove. The cam ring 90 has formed therein a groove 92 whose wall surface is curved in accordance with the various requirements as described above.

Figure 9:
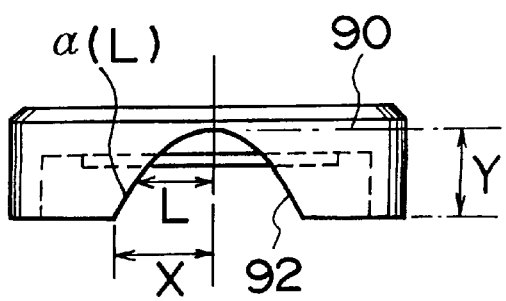
FIG. 9 is a front view of another cam ring that can be used in the hydraulic pressure control valve as illustrated in FIG. 1.
Figure 10:
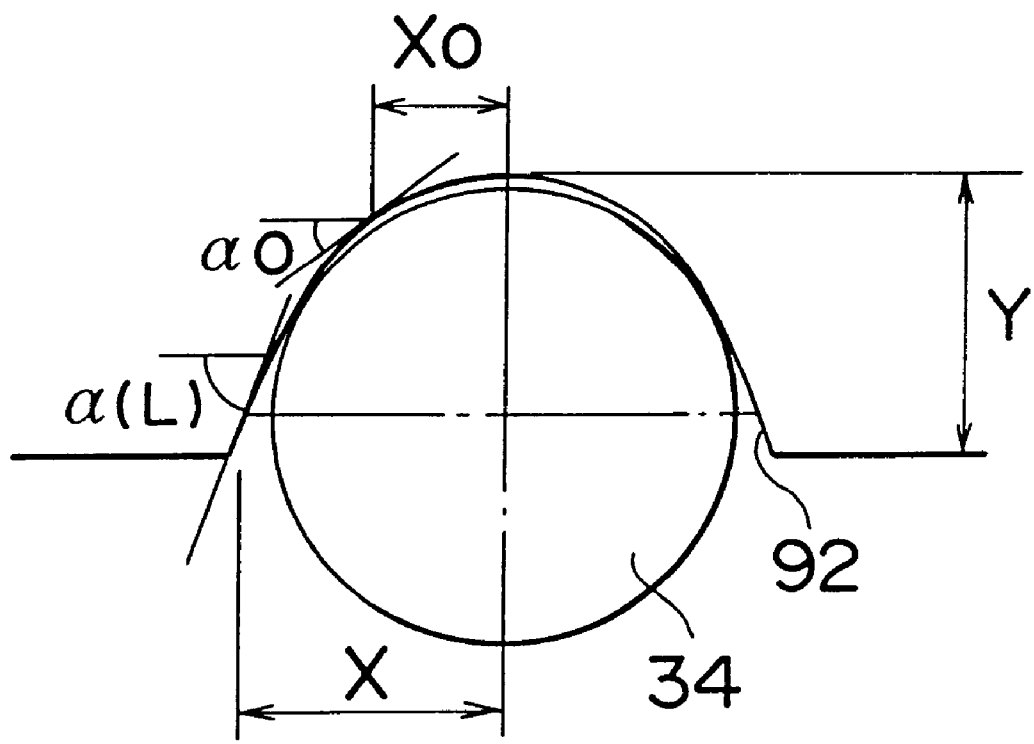
FIG. 10 illustrates a shape of the cam ring as illustrated in FIG. 9.

In FIG. 9 and 10, the groove 92 is formed in the cam ring 90 such that a point on the groove 92 spaced horizontally from the a line representing a central axis of the groove by a distance L corresponds to a function $\alpha(L)$. Further, the groove 92 has a half-width X as expressed in the formula (3). In this case, the depth Y of the groove 92 can be obtained by integrating the inclination $\alpha(L)$ in a range from L=0 to X.

In other words, the groove 92 formed in the cam ring 90 has a shape defined by the function $\alpha(L)$ and a depth Y expressed as $Y = \int \alpha(L) \cdot dL$ (L=0 to L: initial value $\alpha_0$. If the groove 92 meets the conditions described above, it is possible to reliably prevent the reaction force generating member 34 from being displaced across the groove 92. Thus, as is the case with the cam ring 52 according to the first embodiment, the cam ring 90 according to this embodiment can provide the power steering apparatus with enhanced steering stability and increased durability.

The terms used in the foregoing description of the embodiments correspond to those used in the appended claims as follows: the valve shaft 42 corresponds to the claimed "input shaft"; the valve body 14 corresponds to the claimed "output shaft"; the cam ring 52 or 90 "groove member"; the reaction force spring 40 correspond to the claimed "elastic member"; and the amount of axial displacement of the reaction force piston 30 correspond to the claimed "predetermined value".

The amount of axial displacement of the reaction force generating member 34 relative to the cam ring 52 or 90 is defined as the displacement between the hydraulically neutral state of the valve shaft 42 and the valve body 14 and the maximum operational angle $\theta_{MAX}$ formed therebetween corresponds to the claimed "maximum relative displacement amount".

In addition, the valve body 14 having the nut member 28 corresponds to the claimed "main shaft member" and the reaction force piston 30 corresponds to the claimed "sliding member".

While the present invention has been described with reference to what are presently considered to be preferred embodiments thereof, it is understood that the invention is not limited to the disclosed embodiments or constructions.

On the contrary, the invention is intended to cover various modifications and equivalent arrangements. In addition, while the various elements of the disclosed invention are shown in various exemplary combinations and configurations, other combinations and configurations are also within the spirit and scope of the invention as defined by the following claims.

What is claimed is:

1. A power steering apparatus comprising:

an input shaft adapted to be coupled to a steering wheel;

an output shaft adapted to be connected to wheels to be steered;

a groove member having a groove and rotating together with one of the input shaft and the output shaft;

a reaction force generating member that is supported by another of the input shaft and the output shaft and is unmovable in a radial direction with respect to one of the input shaft and the output shaft and movable in an axial direction of the input shaft and the output shaft by a distance smaller than a predetermined value;

an elastic member urging one of the groove member and the reaction force generating member toward another of the groove member and the reaction force generating member; and means for generating a steering assisting force corresponding to an operational angle formed between the input shaft and the output shaft, wherein the operational angle formed between the input shaft and the output shaft is limited to a value smaller than a predetermined maximum operational angle, a maximum relative displacement amount in the axial direction is generated between the groove member and the reaction force generating member in correspondence with the maximum operational angle, and the groove has a depth larger than the maximum relative displacement amount.

2. The power steering apparatus according to claim 1, wherein the reaction force generating member is provided with a rotational shaft attached to another of the input shaft and the output shaft and a rolling body rolling around the rotational shaft.

3. The power steering apparatus according to claim 1, wherein the another of the input shaft and the output shaft is provided with a main shaft member and a sliding member axially slidable with respect to the main shaft member and the reaction force generating member is supported by the sliding member.

4. The power steering apparatus according to claim 1, wherein the groove in the groove member has a shape of V.

5. The power steering apparatus according to claim 4, wherein the V-shaped groove in the groove member has a curved surface.

6. In a power steering apparatus, the improvement in a rotary type directional control valve, comprising:

an input shaft adapted to be coupled to a steering wheel;

an output shaft adapted to be connected to wheels to be steered;

a groove member having a groove and rotating together with one of the input shaft and the output shaft;

a reaction force generating member that is supported by another of the input shaft and the output shaft and is unmovable in a radial direction with respect to one of the input shaft and the output shaft and movable in an axial direction of the input shaft and the output shaft by a distance smaller than a predetermined value; and an elastic member urging one of the groove member and the reaction force generating member toward another of the groove member and the reaction force generating member, wherein the operational angle formed between the input shaft and the output shaft is limited to a value smaller than a predetermined maximum operational angle, a maximum relative displacement amount in the axial direction is generated between the groove member and the reaction force generating member in correspondence with the maximum operational angle, and the groove has a depth larger than the maximum relative displacement amount.

7. The improvement in a rotary type directional control valve in a power steering apparatus according to claim 6, wherein the reaction force generating member is provided with a rotational shaft attached to the another of the input shaft and the output shaft and a rolling body rolling around the rotational shaft.

8. The improvement in a rotary type directional control valve in a power steering apparatus according to claim 6, wherein the another of the input shaft and the output shaft is provided with a main shaft member and a sliding member axially slidable with respect to the main shaft member and the reaction force generating member is supported by the sliding member.

* * * * *